US008258742B2

(12) United States Patent
Funakoshi (10) Patent No.: US 8,258,742 B2
(45) Date of Patent: Sep. 4, 2012

(54) CHARGING CONTROL UNIT OF ELECTRIC POWER GENERATION CONTROL DEVICE FOR MOTOR VEHICLE (75) Inventor: Hiroshi Funakoshi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 584 days.

(21) Appl. No.: 12/361,915

(22) Filed: Jan. 29, 2009

(65) Prior Publication Data
US 2009/0241652 A1 Oct. 1, 2009

(30) Foreign Application Priority Data

Mar. 25, 2008 (JP) ................................. 2008-078038

(51) Int. Cl.
H02J 7/16 (2006.01)
(52) U.S. Cl. ........................................ 320/104; 320/155
(58) Field of Classification Search .................... 320/104
See application file for complete search history.

(56) References Cited

U.S. PATENT DOCUMENTS

| 5,449,996 A * | 9/1995 | Matsumoto et al. .......... 320/148 |
| 2008/0053715 A1* | 3/2008 | Suzuki et al. .................. 180/2.1 |
| 2009/0043476 A1* | 2/2009 | Saito et al. .................... 701/102 |

FOREIGN PATENT DOCUMENTS

JP 2006-230102 A 8/2006

* cited by examiner

Primary Examiner — Arun Williams
(74) Attorney, Agent, or Firm — Birch, Stewart, Kolasch & Birch, LLP (57) ABSTRACT The control device, which is driven by an engine mounted on the vehicle, generates electric power and determines a power generation voltage for supplying the electric power to an electrical load and an electricity storage unit, comprising an electricity storage amount detection unit for detecting an amount of electricity stored in the electricity storage unit, by integrating an input/output current to/from the electricity storage unit a voltage lowering unit for lowering the power generation voltage when a predetermined electricity storage amount is detected by the electricity storage amount detection unit, a time measuring unit for measuring time elapsed after termination of charging/discharging of the electricity storage unit, and a lowering prohibition unit for prohibiting the power generation voltage from being lowered by the voltage lowering unit if the time elapsed after termination of the charging/discharging is longer than or equal to a predetermined time.

5 Claims, 9 Drawing Sheets

CHARGING CONTROL UNIT OF ELECTRIC POWER GENERATION CONTROL DEVICE FOR MOTOR VEHICLE

BACKGROUND OF THE INVENTION

1. Field of the Invention

The present invention relates to electric power generation control devices for motor vehicles, and more particularly, to techniques for controlling the power generation voltage of an electric power generator for charging electricity storage means mounted on a vehicle.

2. Description of the Related Art

Generally, a motor vehicle is equipped with a battery (electricity storage means) as a source of electric power to be supplied to electrical devices such as lamps, and also with an electric power generator (alternator) driven by the engine of the vehicle to charge the battery. The electric power generator has its power generation voltage controlled so that the charged capacity of the battery may become larger than or equal to a target value (target charged capacity). In this type of vehicle, energy regeneration is often carried out. Specifically, during deceleration, kinetic energy is converted to electric energy to be stored in the battery, and the energy stored in the battery is used during the time other than the deceleration, thereby saving energy. Also, in order to determine with accuracy the charged capacity of the battery, a technique has been developed wherein the battery is once fully charged when the engine is started, and at the moment the battery charging current is saturated, the battery is judged to be fully charged.

With this full charge determination method, the battery is not judged to be fully charged until the battery charging current becomes saturated after the start of the engine, and thus the charged capacity of the battery cannot be accurately determined in the meantime, making it difficult to set a suitable charging voltage. Accordingly, the regeneration efficiency lowers, resulting in lowering of the fuel efficiency. This problem is noticeable especially in the case where the engine is started and stopped repeatedly at short intervals of time and thus the full charge determination is made frequently.

As a conceivable solution, a method may be adopted wherein the target charged capacity of the battery is set to a large value beforehand in order to expedite the full charge determination. If the target charged capacity is set high in advance, however, the situation where charging of the battery is effected while the charged capacity is relatively high occurs more frequently. Consequently, the battery charging efficiency lowers and the regeneration efficiency does not improve much as intended.

To solve the above problem, a control device has been proposed in Unexamined Japanese Patent Publication No. 2006-230102 in which, instead of making the aforementioned full charge determination at the start of the engine, the engine stoppage time is measured and the charged capacity of the battery is estimated by subtracting a discharged capacity corresponding to the stoppage time from the previously measured capacity.

In the control device disclosed in the patent publication, however, the charged capacity of the battery is estimated simply on the basis of the engine stoppage time, and accordingly, there is the possibility that the charged capacity of the battery is estimated to be higher than an actual capacity. If the battery is charged on the basis of the estimated charged capacity higher than an actual capacity and the power generation voltage remains lower than the required voltage as a result, the charged capacity gradually lowers and the battery becomes over-discharged, causing engine start failure or reduction in the service life of the battery.

SUMMARY OF THE INVENTION

The present invention was made to solve the above problems, and an object thereof is to provide an electric power generation control device for a motor vehicle, which device is capable of quickly controlling a charging voltage to a suitable value just after the start of charging, thereby improving regeneration efficiency, and also capable of preventing electricity storage means from being over-discharged as a result of stoppage of the vehicle.

To achieve the object, the present invention provides an electric power generation control device driven by an internal combustion engine mounted on a motor vehicle, for generating electric power and determining a power generation voltage for supplying the electric power to an electrical load and electricity storage means of the vehicle. The electric power generation control device comprises: electricity storage amount detection means for detecting an amount of electricity stored in the electricity storage means, by integrating an input/output current to/from the electricity storage means; voltage lowering means for lowering the power generation voltage when a predetermined electricity storage amount is detected by the electricity storage amount detection means; time measuring means for measuring time elapsed after termination of charging/discharging of the electricity storage means; and lowering prohibition means for prohibiting the power generation voltage from being lowered by the voltage lowering means if the time elapsed after termination of the charging/discharging, measured by the time measuring means, is longer than or equal to a predetermined time.

With the electric power generation control device constructed as above, lowering of the power generation voltage is controlled in accordance with the electricity storage amount detected by integrating the input/output current to/from the electricity storage means, and accordingly, the charged capacity of the electricity storage means can be quickly determined just after the engine start, making it possible to control the charging voltage to a suitable voltage and thus to improve the regeneration efficiency. Also, if the time elapsed after the termination of discharging is longer than or equal to the predetermined time, lowering of the power generation voltage is prohibited. Accordingly, in cases where the charged capacity of the electricity storage means has decreased as a result of stoppage of the vehicle, an adequate charging voltage can be secured for the electricity storage means, preventing the electricity storage means from becoming over-discharged.

Preferably, the electric power generation control device of the present invention further comprises initialization means for initializing a stored value indicative of the electricity storage amount of the electricity storage means in accordance with the input/output current and voltage of the electricity storage means when lowering of the power generation voltage is prohibited by the lowering prohibition means.

In the preferred electric power generation control device, when the lowering of the power generation voltage is prohibited by the lowering prohibition means, the stored value indicative of the electricity storage amount of the electricity storage means is initialized depending on the input/output current and voltage of the electricity storage means. Thus, even if the electric power is consumed by an electrical load or loads while the vehicle is stopped, the electricity storage amount of the electricity storage means can be determined with accuracy since error in the stored value indicative of the electricity storage amount is eliminated. It is therefore possible to perform the power generation voltage lowering control with accuracy thereafter on the basis of the electricity storage amount of the electricity storage means.

Preferably, moreover, the electric power generation control device of the present invention further comprises volatilization detection means for detecting loss of the stored value indicative of the electricity storage amount, and when loss of the stored value indicative of the electricity storage amount is detected by the volatilization detection means, the lowering prohibition means prohibits the power generation voltage from being lowered by the voltage lowering means.

In the preferred electric power generation control device, the lowering of the power generation voltage is prohibited when the stored value indicative of the electricity storage amount is lost. Accordingly, the power generation voltage can be prevented from being lowered erroneously due to loss of the stored value indicative of the electricity storage amount, making it possible to more reliably avoid the over-discharge of the electricity storage means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the accompanying drawings.

Figure 1:
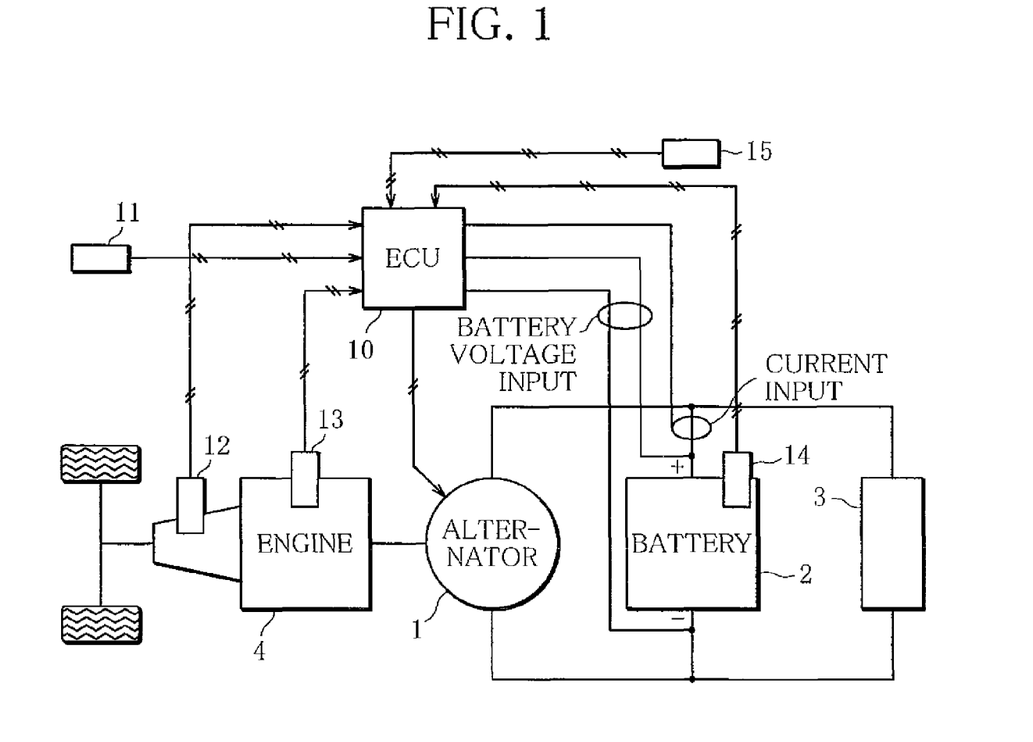
FIG. 1 illustrates a schematic construction of an electric power generation control device for a motor vehicle in accordance with one embodiment of the present invention.
Figure 2:
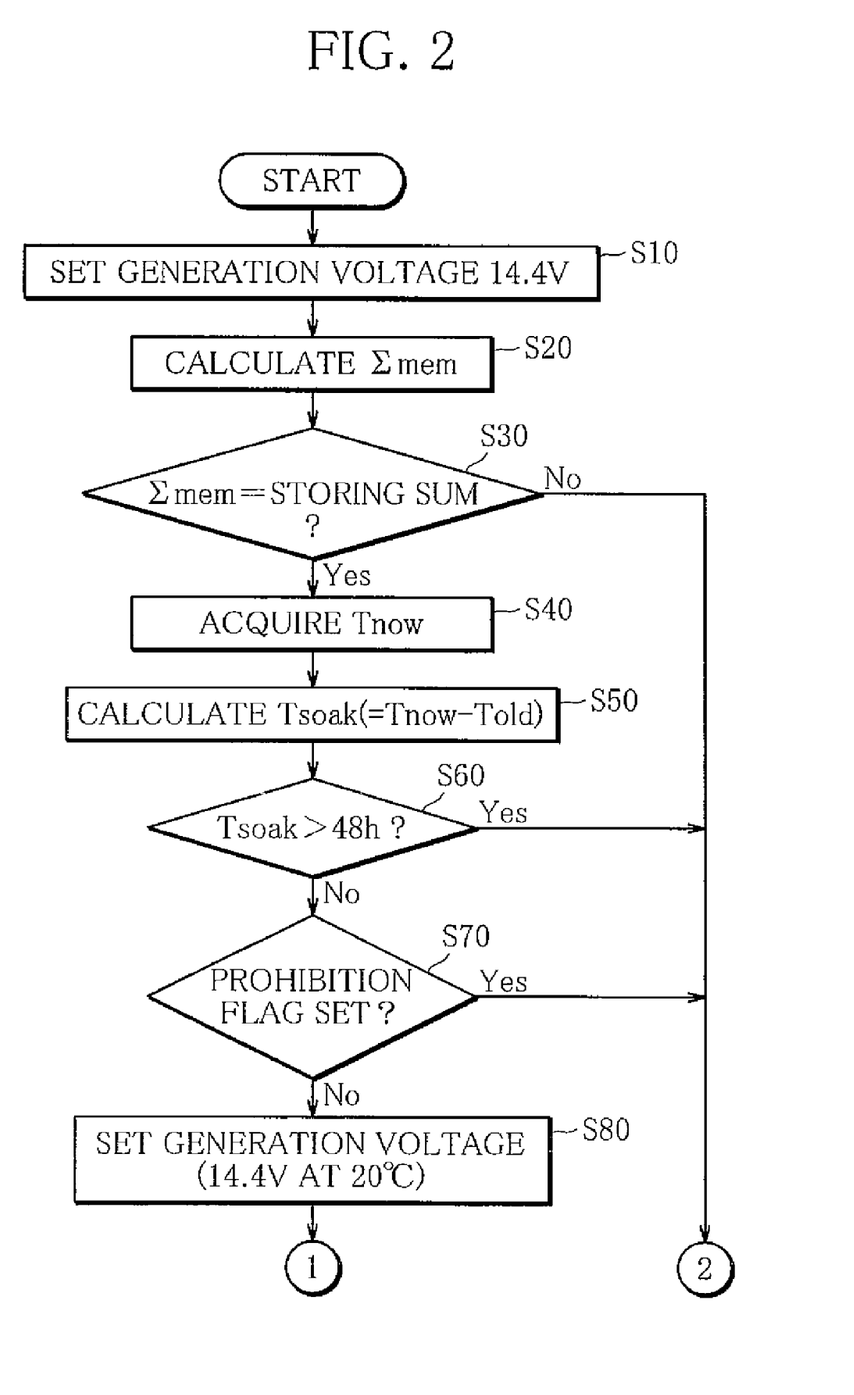
FIG. 2 is a flowchart illustrating a procedure for controlling a power generation voltage of an alternator.
Figure 3:
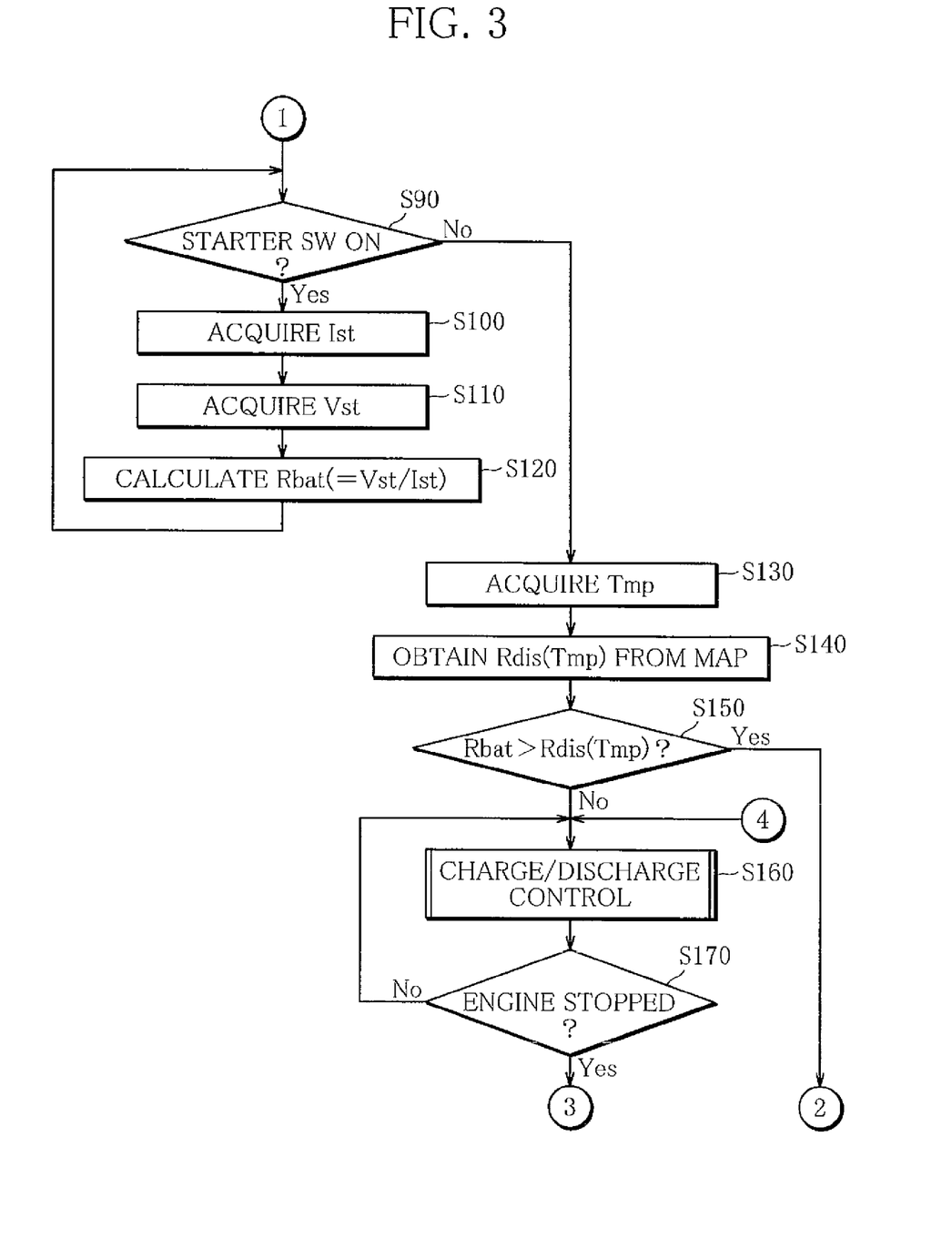
FIG. 3 is a flowchart also illustrating the power generation voltage control procedure for the alternator.
Figure 4:
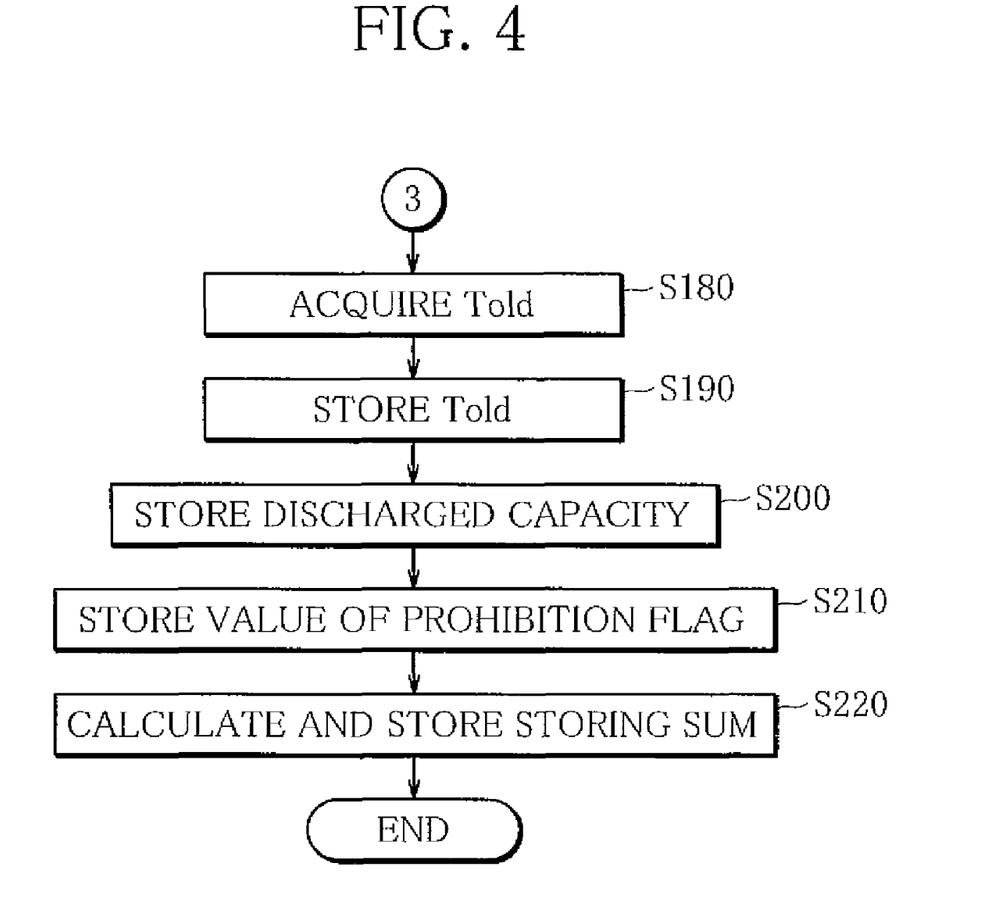
FIG. 4 is a flowchart illustrating the power generation voltage control procedure for the alternator.
Figure 5:
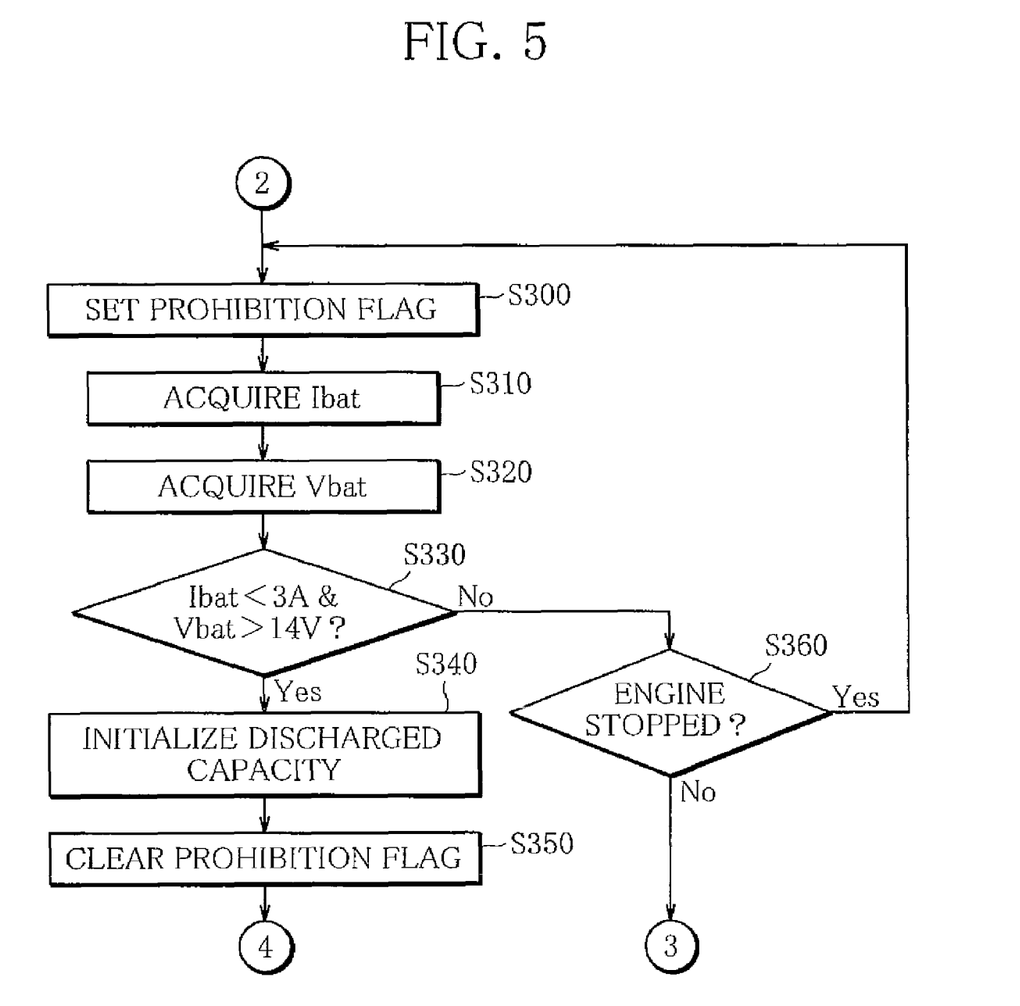
FIG. 5 is a flowchart illustrating the power generation voltage control procedure for the alternator.

FIG. 1 illustrates a schematic construction of an electric power generation control device for a motor vehicle in accordance with the embodiment of the invention.

As shown in FIG. 1, a motor vehicle to which the embodiment is applied is equipped with an alternator (electric power generation means) 1 and a battery (electricity storage means) 2 as power supply equipment. The alternator 1 is electrically connected with an electrical device (automotive electrical load) 3, such as headlamps, and the battery 2 in parallel with one another. The alternator 1 is driven by an engine (internal combustion engine) 4 for moving the vehicle, to generate electricity, the generated electric power being supplied to the electrical device 3 such as headlamps and also to the battery 2 to charge same.

An ECU 10 includes input/output devices, storage devices (ROM, RAM, nonvolatile RAM, etc.), a central processing unit (CPU), and a timepiece. The ECU 10 is input with information detected by various sensors such as an accelerator pedal sensor 11 for detecting the position of an accelerator pedal, a vehicle speed sensor 12, an engine speed sensor 13 and a battery temperature sensor 14, as well as with an operation signal from a starter switch 15 of the engine 4 and a voltage and charging current of the battery 2.

The output side of the ECU 10 is connected to the alternator 1. The ECU 10 outputs a control signal to the alternator 1 to control its power generation voltage.

FIGS. 2 through 5 are flowcharts illustrating a procedure for controlling the power generation voltage of the alternator 1 by the ECU 10. The illustrated routine is executed upon start of the engine.

First, in Step S10, a control signal is output to the alternator 1 to set the power generation voltage to 14.4 V. Step S20 is then executed to calculate a backup memory area sum Σmem corresponding to the amount of usage of a backup memory, described later.

Subsequently, in Step S30, it is determined whether or not the sum Σmem calculated in Step S20 is equal to a storing sum, described later (volatilization detection means for detecting loss of a stored value indicative of an electricity storage amount). If the sum Σmem is equal to the storing sum, Step S40 is executed in which a current time Tnow is acquired from the timepiece. Then, in Step S50, based on the current time Tnow acquired in Step S40 and a previous engine stop time Told stored in Step S190, explained later, a soak time (vehicle standing time) Tsoak is calculated as a time elapsed after the termination of charging/discharginq of the battery 2 (time measuring means). Specifically, the soak time is calculated according to Tsoak=Tnow−Told. The routine then proceeds to Step S60.

In Step S60, it is determined whether or not the soak time Tsoak calculated in Step S50 is longer than 48 hours. If the soak time is not longer than 48 hours, the routine proceeds to Step S70. In Step S70, it is determined whether or not a power generation voltage lowering prohibition flag, described later, has been set (whether the flag is "1" or not). If the generation voltage lowering prohibition flag is not set, the routine proceeds to Step S80, wherein a control signal is output to the alternator 1 so that the power generation voltage may become equal to 14.4 V. The power generation voltage 14.4 V is a reference voltage that is applied when the battery temperature is 20° C. In practice, therefore, the power generation voltage is increased or decreased from 14.4 V in accordance with the detected battery temperature input from the battery temperature sensor 14. The routine then proceeds to Step S90.

In Step S90, it is determined whether or not the starter switch (SW) 15 of the engine 4 is ON. If the starter switch 15 is ON, a starting battery current Ist is acquired in Step S100, and a starting battery voltage Vst is acquired in Step S110. Then, in Step S120, a battery internal resistance Rbat is calculated from the starting battery current Ist acquired in Step S100 and the starting battery voltage Vst acquired in Step S110. Specifically, the internal resistance of the battery is calculated according to Rbat=Vst/Ist. After executing Step S120, the routine returns to Step S90.

On the other hand, if it is judged in Step S90 that the starter switch of the engine 4 is not ON, the routine proceeds to Step S130. In Step S130, the battery temperature Tmp is acquired from the battery temperature sensor 14, and then in Step S140, an internal resistance Rdis(Tmp) for discriminating discharge is calculated. Specifically, using the battery temperature Tmp acquired in Step S130, a map prepared beforehand is searched to obtain a corresponding discharge-discriminating internal resistance Rdis(Tmp).

Subsequently, in Step S150, it is determined whether or not the battery internal resistance Rbat calculated in Step S120 is higher than the discharge-discriminating internal resistance Rdis(Tmp) calculated in Step S140. If it is judged that the battery internal resistance Rbat is not higher than the discharge-discriminating internal resistance Rdis(Tap), that is, if the former is judged to be lower than or equal to the latter, the routine proceeds to Step S160.

In Step S160, a subroutine for a charge/discharge control process, described later, is executed, and the routine proceeds to Step S170. In Step S170, an engine rotation speed is acquired from the engine speed sensor 13 to determine whether or not the engine 4 is stopped. If the engine is stopped, the routine proceeds to Step S180; if not, the routine returns to Step S160.

In Step S180, a current time Told is acquired from the timepiece, and then in Step S190, the current time Told acquired in Step S180 is stored in the backup memory as the engine stop time Told. Subsequently, in Step S200, a discharged capacity "new", explained later, is stored in the backup memory, and the routine proceeds to Step S210. In Step S210, the value of the generation voltage lowering prohibition flag is stored in the backup memory. Then, in Step S220, the storing sum is calculated and stored in the backup memory. Specifically, the storing sum is calculated by adding up all values held at the addresses allocated to the backup memory, whereupon the routine ends.

The routine proceeds to Step S300 when it is judged in Step S30 that the backup memory area sum Σmem is not equal to the storing sum, or when it is judged in Step S60 that the soak time Tsoak is longer than 48 hours, or when it is judged in Step S70 that the generation voltage lowering prohibition flag is being set, or when it is judged in Step S150 that the battery internal resistance Rbat is higher than the discharge-discriminating internal resistance Rdis(Tmp).

In Step S300, the generation voltage lowering prohibition flag is set to "1" (ON). Then, in Step S310, a battery current Ibat is acquired, and in Step S320, a battery voltage Vbat is acquired.

Subsequently, in Step S330, it is determined whether or not the battery current Ibat acquired in Step S310 is smaller than 3 A and at the same time the battery voltage Vbat acquired in Step S320 is higher than 14 V. If the battery current Ibat is smaller than 3 A and at the same time the battery voltage Vbat is higher than 14 V, the routine proceeds to Step S340, in which the discharged capacity "new" of the battery 2 is reset to an initial value (initialization means for initializing the stored value indicative of the electricity storage amount). Then, in Step S350, the generation voltage lowering prohibition flag is cleared to "0" (OFF), whereupon the routine proceeds to Step S160.

If it is judged in Step S330 that the battery current Ibat is larger than or equal to 3 A or that the battery voltage Vbat is lower than or equal to 14 V, the routine proceeds to Step S360. In Step S360, the engine rotation speed is acquired from the engine speed sensor 13 and a determination is made as to whether or not the engine 4 is stopped. If the engine is stopped, the routine returns to Step S300; if not, the routine proceeds to Step S180.

Figure 6:
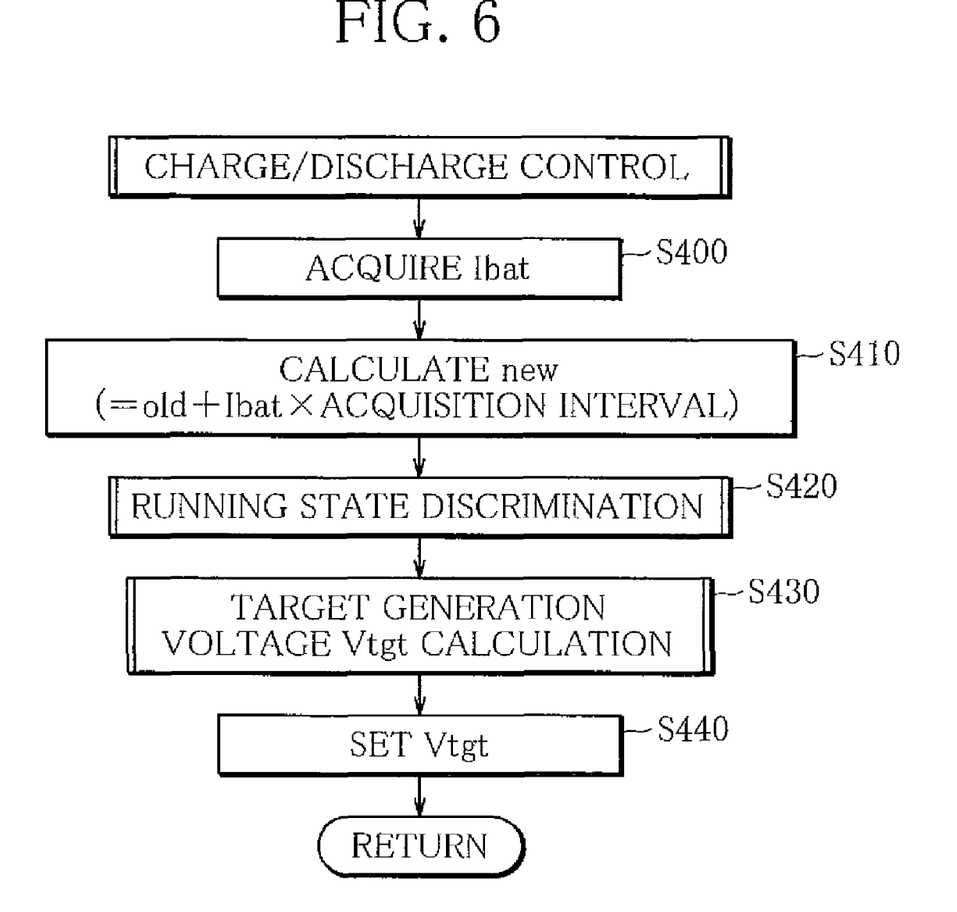
FIG. 6 is a flowchart illustrating a subroutine for a charge/discharge control process.

FIG. 6 is a flowchart illustrating a subroutine for the charge/discharge control process executed in Step S160 of the aforementioned main routine.

Upon start of the subroutine, first, the battery current Ibat is acquired in Step S400. Then, in Step S410, the discharged capacity "new" of the battery 2 is calculated according to the following equation (1):

$$\text{Discharged Capacity "new"} = \text{Discharged Capacity "old"} + I_{bat} \times I_{bat}\text{ Acquisition Interval} \qquad (1)$$

where the discharged capacity "old" is a previously calculated discharged capacity and is read from the backup memory, Ibat is the battery current acquired in Step S400, and the Ibat acquisition interval corresponds to a time period from the previous calculation of the discharged capacity "old" to the present acquisition of the battery current Ibat (electricity storage amount detection means). The discharged capacity "old" is an index used in the present invention as indicative of the electricity storage amount, and Step S410 corresponds to electricity storage amount detection means of the present invention.

Subsequently, in Step S420, a running state discrimination subroutine, described below, is executed, and in Step S430, a target generation voltage Vtgt calculation subroutine, also described later, is executed. In Step S440, a control signal is output to the alternator 1 so that a target generation voltage Vtgt calculated in Step S430 may be set as the power generation voltage, whereupon the subroutine ends and the process returns to the main routine.

Figure 7:
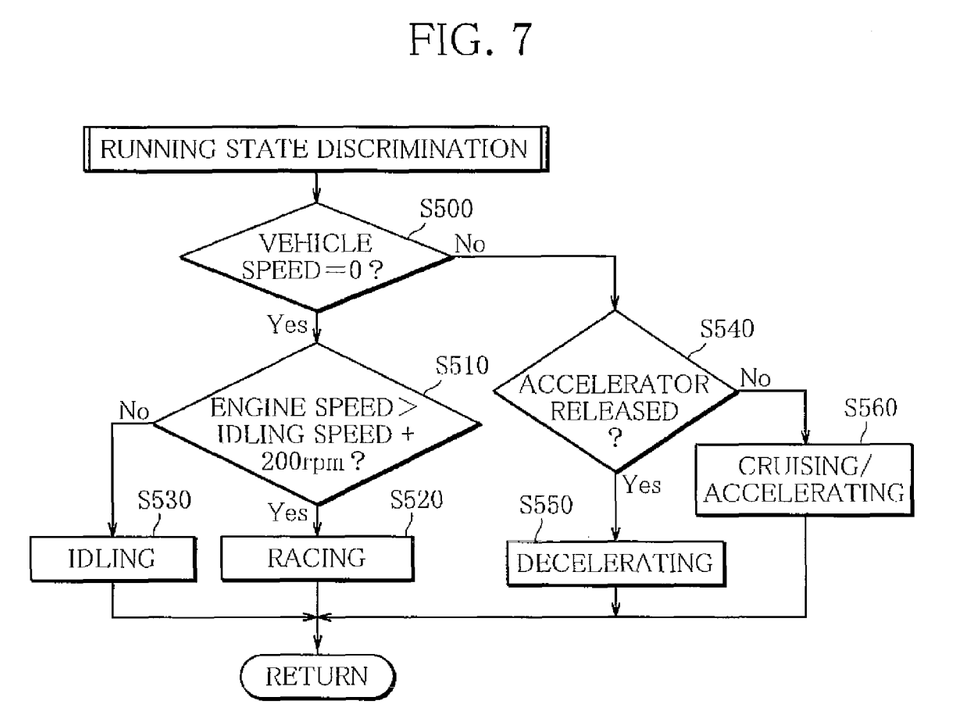
FIG. 7 is a flowchart illustrating a subroutine for a running state discrimination process.

FIG. 7 is a flowchart illustrating the running state discrimination subroutine executed in Step S420 of the aforementioned charge/discharge control subroutine.

Upon start of the running state discrimination subroutine, first in Step S500, the vehicle speed is acquired from the vehicle speed sensor 12 and a determination is made as to whether or not the vehicle speed is zero ("0"). If the vehicle speed is "0", the subroutine proceeds to Step S510.

In Step S510, it is determined whether or not the engine rotation speed acquired from the engine speed sensor 13 is higher than the sum of a preset idling speed and 200 rpm. If the sum of the idling speed and 200 rpm is exceeded, the subroutine proceeds to Step S520 in which the engine 4 is judged to be in a racing state, whereupon the subroutine ends. If it is judged in Step S510 that the engine rotation speed is lower than or equal to the sum of the idling speed plus 200 rpm, the subroutine proceeds to Step S530 in which the engine 4 is judged to be in an idling state, whereupon the subroutine ends.

If it is judged in Step S500 that the vehicle speed is not "0", the subroutine proceeds to Step S540.

In Step S540, it is determined whether the accelerator pedal is released or not on the basis of the output from the accelerator pedal sensor 11. If it is judged that the accelerator pedal is released, the subroutine proceeds to Step S550 in which the vehicle is judged to be in a decelerating state, whereupon the subroutine ends. On the other hand, if it is judged in Step S540 that the accelerator pedal is not released, the subroutine proceeds to Step S560 in which the vehicle is judged to be in a cruising or accelerating state, whereupon the subroutine ends.

Figure 8:
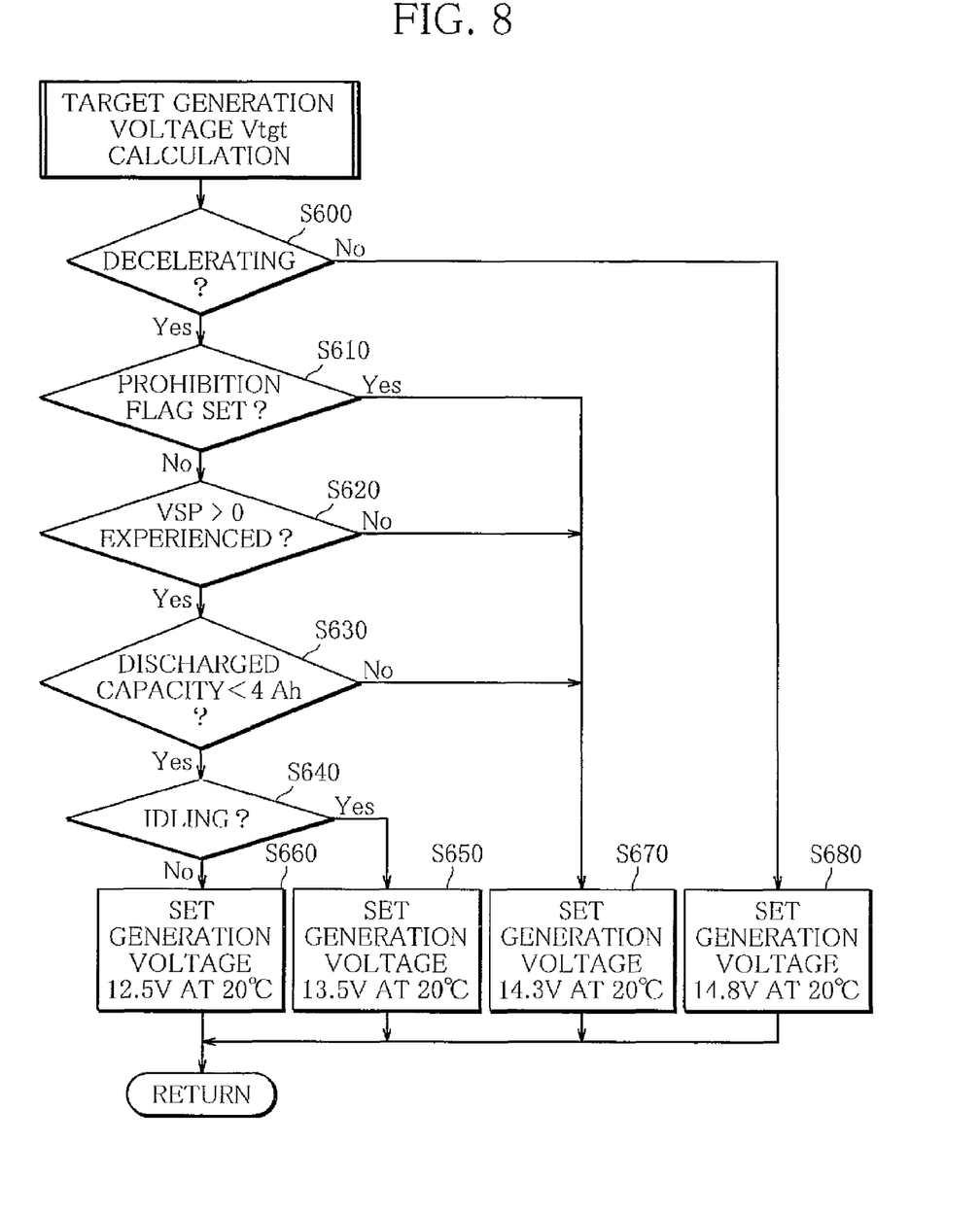
FIG. 8 is a flowchart illustrating a subroutine for a target generation voltage calculation process.

FIG. 8 is a flowchart illustrating the target generation voltage Vtgt calculation subroutine executed in Step S430 of the charge/discharge control subroutine.

Upon start of the calculation subroutine, first in Step S600, it is determined whether or not the state discriminated in the running state discrimination subroutine is the decelerating state. If the discriminated state is the decelerating state, the subroutine proceeds to Step S610, where it is determined whether the generation voltage lowering prohibition flag has been set or not (whether the flag value is "1" or not). If the generation voltage lowering prohibition flag is not set, the subroutine proceeds to Step S620.

In Step S620, it is determined whether or not a vehicle speed VSP higher than "0" (VSP>0) has been experienced even once after the start of the engine. If the state VSP>0 has been experienced even once after the engine start, that is, if the vehicle has been run even once after the engine start, the subroutine proceeds to Step S630. In Step S630, it is determined whether or not the discharged capacity "new" calculated in Step S410 is smaller than 4 Ah. If the discharged capacity "new" is smaller than 4 Ah, the subroutine proceeds to Step S640.

In Step S640, it is determined whether or not the state discriminated in the running state discrimination subroutine is the idling state. If the discriminated state is the idling state, the subroutine proceeds to Step S650. In Step S650, a control signal is output to the alternator 1 so that the reference power generation voltage at the battery temperature 20° C. may be set to 13.5 V, whereupon the subroutine ends. If it is judged in Step S640 that the discriminated state is not the idling state, the subroutine proceeds to Step S660. In Step S660, a control signal is output to the alternator 1 so that the reference power generation voltage at the battery temperature 20° C. may be set to 12.5 V, whereupon the subroutine ends. Steps S630, S650 and S660 correspond to power generation voltage lowering means of the present invention.

The subroutine proceeds to Step S670 when it is judged in Step S610 that the generation voltage lowering prohibition flag is set, or when it is judged in Step S620 that the state VSP>0 has not been experienced yet, or when it is judged in Step S630 that the discharged capacity "new" is greater than or equal to 4 Ah. In Step S670, a control signal is output to the alternator 1 so that the reference power generation voltage at the battery temperature 20° C. may be set to 14.3 V, whereupon the subroutine ends.

If it is judged in Step S600 that the discriminated state is not the decelerating state, the subroutine proceeds to Step S680. In Step S680, a control signal is output to the alternator 1 so that the reference power generation voltage at the battery temperature 20° C. may be set to 14.8 V, whereupon the subroutine ends.

As a result of the control procedure described above, the electric power generation control device according to this embodiment obtains the discharged capacity "new" of the battery 2 by integrating the battery current Ibat (S410) and determines, based on the discharged capacity "new" and the running state of the vehicle, the power generation voltage to be applied by the alternator 1 (target generation voltage Vtgt calculation subroutine). For example, the power generation voltage is set to 14.3 V when the discharged capacity of the battery 2 is greater than or equal to 4 Ah during the deceleration, and is set to a lower voltage (12.5 V or 13.5 V) when the discharged capacity is smaller than 4 Ah during the deceleration.

Thus, according to the embodiment, since the discharged capacity of the battery 2 is calculated by integrating the charging current, the charged capacity of the battery 2 can be quickly determined at the start of the engine, without the need to wait for the charging current to be saturated, thus making it possible to immediately initiate the power generation voltage control in an appropriate manner. Especially, even in the case where the engine 4 is started and stopped repeatedly at short intervals of time, the regeneration efficiency can be improved.

Further, in the embodiment, a determination is made as to whether or not the vehicle remains standing over a time longer than 48 hours without being moved, and if the vehicle remains standing longer than 48 hours (S60), the lowering of the power generation voltage (to 12.5 V or 13.5 V) is prohibited (S300). Where the vehicle remains standing longer than 48 hours, a determination is made as to whether the battery is fully charged or not (whether the battery current Ibat is smaller than 3 A and at the same time the battery voltage Vbat is higher than 14 V) (S330). If the battery is judged to be fully charged, the discharged capacity "new" is initialized (S340) and the lowering of the power generation voltage is permitted (S350).

Thus, according to the embodiment, decrease in the charged capacity of the battery 2 is detected by determining whether or not the vehicle remains standing over a time longer than 48 hours without being moved.

Figure 9:
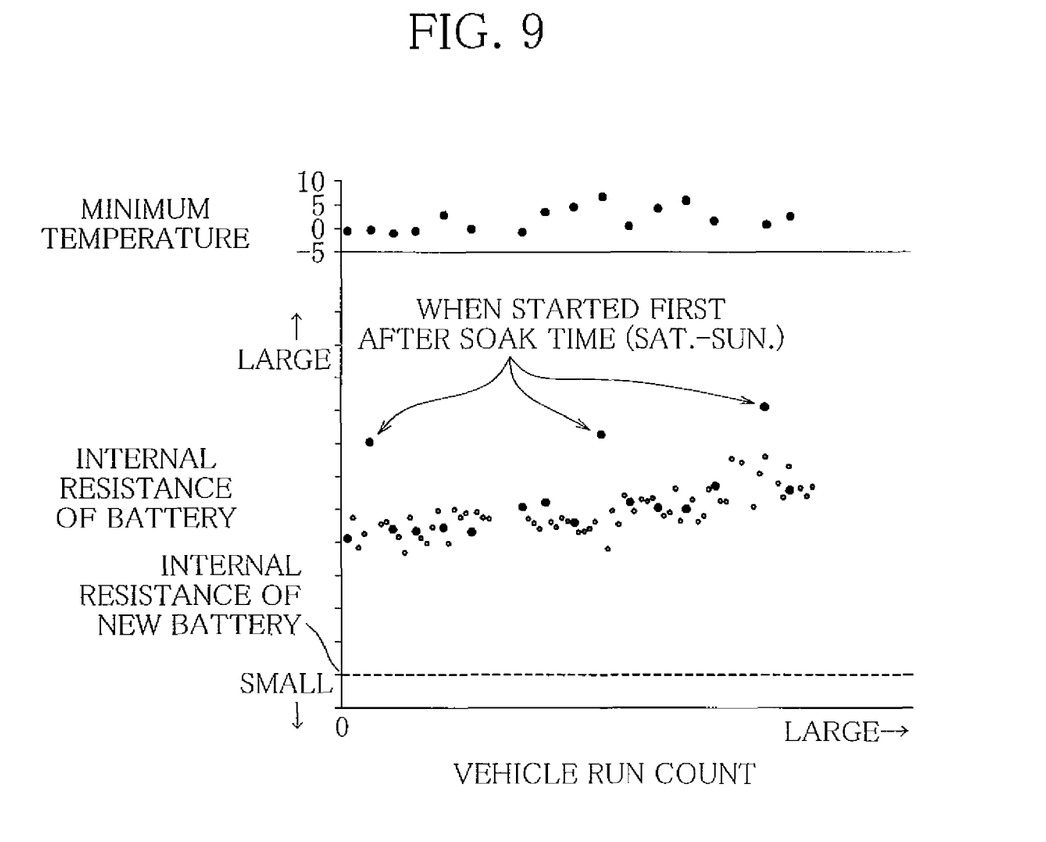
FIG. 9 is a graph showing change in internal resistance of a battery at startup.

FIG. 9 is a graph showing how the internal resistance of the battery at the startup changes. On the graph is plotted data obtained during a period of about one month immediately before the expiration of the service life of a battery, wherein the horizontal axis indicates a vehicle run count, namely, a startup count, and the vertical axis indicates the internal resistance of the battery. Also, the vehicle was not run (the vehicle was left stopped) for two consecutive days in a week, that is, on Saturdays and Sundays (two-day soak time).

As seen from FIG. 9, when the engine is started for the first time on Monday morning, the internal resistance invariably shows a significantly large value. This proves that when a two-day soak time is detected, the charged capacity of the battery can be estimated to have substantially decreased.

Where the vehicle has been kept stopped longer than 48 hours, that is, where the charged capacity of the battery 2 has decreased, the lowering of the power generation voltage is prohibited. Thus, when the charged capacity of the battery 2 is low due to a long stoppage of the vehicle, an adequate charging voltage is secured for the battery 2, thereby avoiding over-discharge of the battery 2. Also, where the vehicle remains standing over a time longer than 48 hours, the discharged capacity "new" is initialized, and therefore, error in the discharged capacity "new" is eliminated, making it possible to accurately control the power generation voltage thereafter.

As described above, according to the embodiment, the charged capacity of the battery 2 is quickly determined at the start of the engine, and also decrease in the charged capacity of the battery 2 due to stoppage of the vehicle is detected to control the power generation voltage. Since over-discharge of the battery 2 can be avoided as a result, the target charging voltage of the battery 2 can be set low. By setting the target charging voltage of the battery 2 to a low voltage, it is possible to efficiently charge the battery, thereby remarkably improving the regeneration efficiency.

In the foregoing embodiment, moreover, the lowering of the power generation voltage is prohibited also when the backup memory area sum Σmem coincides with the storing sum, namely, when the backup memory is in an overflow condition. This prevents the power generation voltage from being lowered erroneously due to error in the electricity storage amount stored in the backup memory, making it possible to more reliably avoid over-discharge of the battery 2.

What is claimed is:

1. An electric power generation control device, having electric power generation means driven by an internal combustion engine mounted on a motor vehicle, for generating electric power and determining a power generation voltage for supplying the electric power to an electrical load and electricity storage means of the vehicle, comprising:

electricity storage amount detection means for detecting an amount of electricity stored in the electricity storage means, by integrating an input or output current to or from the electricity storage means;

voltage lowering means for lowering the power generation voltage when a predetermined electricity storage amount is detected by the electricity storage amount detection means;

time measuring means for measuring time elapsed after termination of charging and discharging of the electricity storage means; and     lowering prohibition means for prohibiting the power generation voltage, generated by the power generation means, from being lowered by the voltage lowering means if the time elapsed after termination of the charging and discharging, measured by the time measuring means, is longer than or equal to a predetermined time.

2. The electric power generation control device according to claim 1, further comprising:

initialization means for initializing a stored value indicative of the electricity storage amount of the electricity storage means in accordance with the input or output current and voltage of the electricity storage means when lowering of the power generation voltage is prohibited by the lowering prohibition means.

3. The electric power generation control device according to claim 1, further comprising:

volatilization detection means for detecting loss of the stored value indicative of the electricity storage amount,     wherein, when loss of the stored value indicative of the electricity storage amount is detected by the volatilization detection means, the lowering prohibition means prohibits the power generation voltage from being lowered by the voltage lowering means.

4. The electric power generation control device according to claim 2, further comprising:

volatilization detection means for detecting loss of the stored value indicative of the electricity storage amount,     wherein, when loss of the stored value indicative of the electricity storage amount is detected by the volatilization detection means, the lowering prohibition means prohibits the power generation voltage from being lowered by the voltage lowering means.

5. The electric power generation control device according to claim 1, wherein the elapsed time measured by the time measuring means is a soak time.

\* \* \* \* \*